United States Patent [19]
Dixon

[11] Patent Number: 4,856,364
[45] Date of Patent: Aug. 15, 1989

[54] HANDLEBAR DEVICE FOR CONTAINING A PORTABLE RADIO APPARATUS

[76] Inventor: John Dixon, Pioneer Realty, P.O. Box 33, Flippin, Ark. 72634

[21] Appl. No.: 123,528

[22] Filed: Nov. 20, 1987

[51] Int. Cl.⁴ .................... B62K 21/12; B62K 21/26
[52] U.S. Cl. ................... 74/551.8; 74/551.9; 280/288.4; 280/304.5
[58] Field of Search ............... 74/551.8, 551.9, 551.1, 74/551.2; 280/270, 289 H, 289 R, 261, 263, 281 LP, 289 S

[56] References Cited

U.S. PATENT DOCUMENTS

| | | | |
|---|---|---|---|
| 2,416,160 | 2/1947 | Davidsson | 74/551.9 |
| 2,588,671 | 3/1952 | Tringali | 280/289 |
| 2,754,505 | 7/1956 | Kenyon | 74/551.8 |
| 3,667,315 | 6/1972 | Polly | 74/551.8 |
| 3,944,924 | 3/1976 | Miyachi | 280/289 X |
| 3,947,954 | 4/1976 | Weiler | 280/289 R X |
| 4,071,892 | 1/1978 | Genzling | 74/551.8 |
| 4,113,043 | 9/1978 | Palmer | 280/289 R X |
| 4,473,251 | 9/1984 | Murayama | 280/289 S X |
| 4,512,567 | 4/1985 | Phillips | 74/551.8 X |
| 4,600,208 | 7/1986 | Morishima | 280/283 A |

FOREIGN PATENT DOCUMENTS 857500 9/1940 France ...................... 74/551.9

Primary Examiner—Vinh Luong
Attorney, Agent, or Firm—Richard C. Litman

[57] ABSTRACT

A handlebar assembly incorporates an apparatus for portable radio reception into a right and left bulbous housing element, one of which may house the portable radio apparatus and both of which house speaker devices. The bulbous housing elements serve as handgrips on a set of handlebars, such as those on bicycles and have disposed on the upper surfaces thereof, speaker grilles for the emitting of sound therefrom with at least one of the bulbous housing elements containing control members for switching and tuning of the portable radio apparatus.

7 Claims, 3 Drawing Sheets

HANDLEBAR DEVICE FOR CONTAINING A PORTABLE RADIO APPARATUS

BACKGROUND OF THE INVENTION

FIELD OF THE INVENTION

This invention relates to a portable radio apparatus for use with a vehicle of handlebars and which may combine control and communicating means within the structure of the handlebars so that the user may enjoy the reception of radio broadcasts while engaging in recreational activities, such as bicycling.

People enjoy and have become accustomed to companionship as provided by radio while driving or exercising or anytime that they are outdoors. The instant invention relates to a means for combining a special gripping means adapter to a handlebar and the inclusion within the gripping means of at least certain components of a portable radio apparatus.

To utilize a radio device on a bicycle or the like vehicle, users in the past have had to employ a portable radio which was either strapped or otherwise hung from the vehicle frame or user's body, with or without an attached headset or earphone.

DESCRIPTION OF THE PRIOR ART

The following cited references are found to be exemplary of the prior art. They are:

| U.S. Pat. No. | Date | Inventor |
| --- | --- | --- |
| 4,445,228 | Apr. 24, 1984 | Bruni |
| 3,714,412 | Jan. 30, 1973 | Franklin |
| 2,927,995 | Mar. 8, 1960 | J. A. Francis |
| 2,765,373 | Oct. 2, 1956 | A. L. Smith |
| 2,490,563 | Dec. 6, 1949 | Van Gastle |

U.S. Pat. No. 2,927,995, issued to J. A. Francis, discloses a fishing rod with a radio contained inside the handle.

U.S. Pat. No. 2,765,373, to A. L. Smith, teaches the construction of a complete hearing aid assembly, including a microphone and an air conduction receiver, contained within the templars of eyeglasses.

U.S. Pat. No. 4,445,228, issued to Bruni, discloses a stereo audio system for a motorcycle which includes a housing for a radio receiver and/or tape deck and speakers mirror assembly and the other patents disclose a radio in combination with a bicycle.

None of the references cited, taken singly or in combination disclose the specific features of the present invention so as to bear up the claims thereof.

SUMMARY OF THE INVENTION

An object of the present invention is to provide means for adapting a portable radio apparatus into a set of handlebars and concurrently to provide communicating means between two sets of stereo audio speakers located and housed within handlegrips located at the ends of the handlebars.

Another object is to provide convenient and safe control means for the radio apparatus so that the user may actuate and tune the radio apparatus, that is contained within the device, without lifting a hand from the safety grips of the device.

Another object is to provide a means for a speaker construction for projecting sounds from the handlegrips. The sound emitted through the grille, that is recessed into the upper surface of the device. this ensures clear and clean sound.

A further object of the invention is to provide means for integrating the device with the structure of the handlebars so as to functionally and structurally unify the device with a standard type of handlebar such as is typically found on bicycles.

DESCRIPTION OF THE PREFERRED EMBODIMENT

Figure 1:
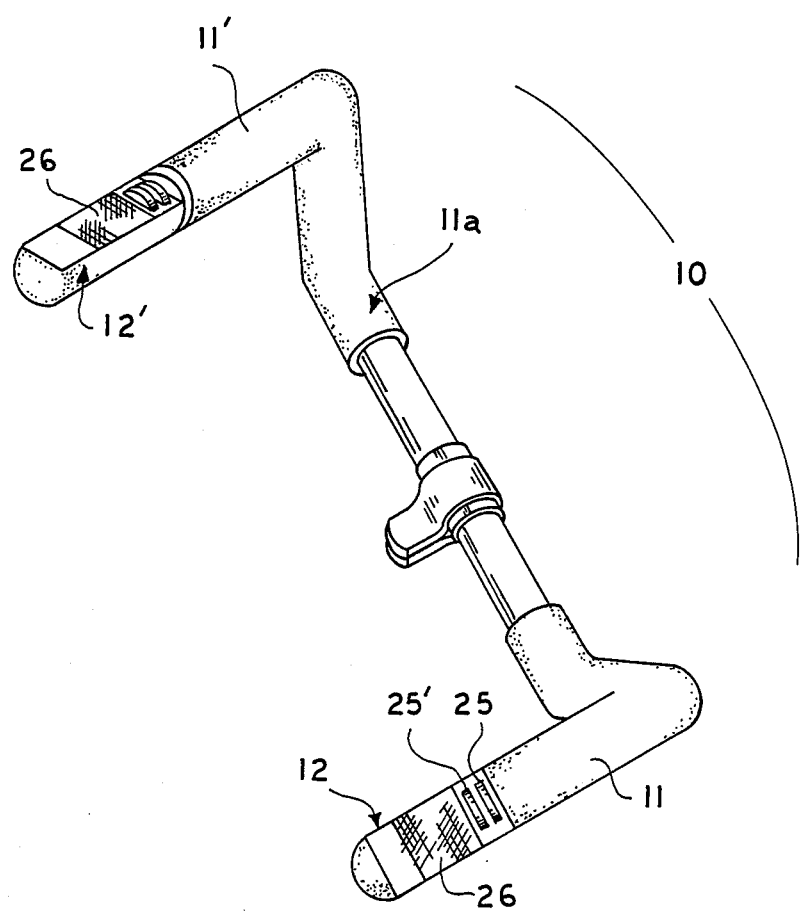
FIG. 1 is a perspective view of the device that illustrates an embodiment having components a portable radio within the interior of the handlegrips.
Figure 2:
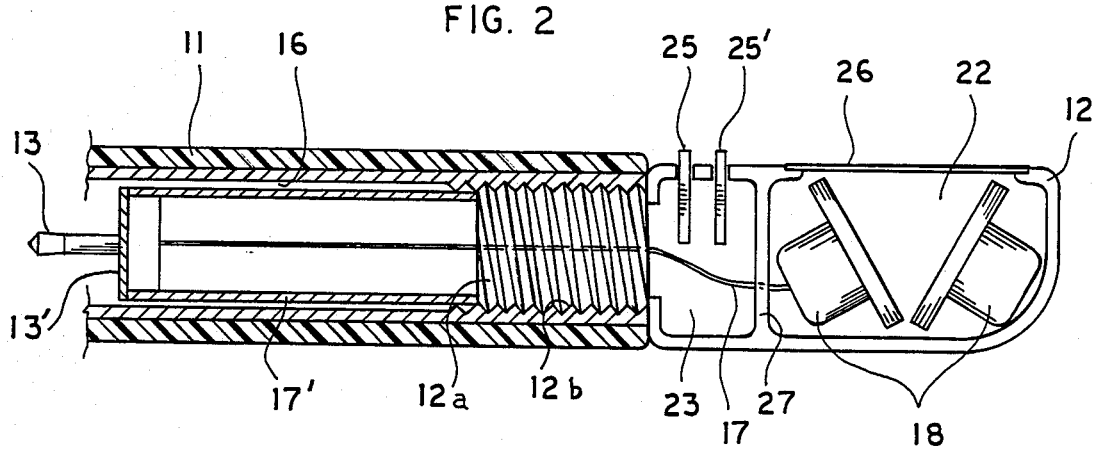
FIG. 2 is a longitudinal sectional view of one of the handlegrips FIG. 3, with the addition of the handlebar end section, and illustrates the preferred embodiment and best mode of operation of the device.
Figure 3:
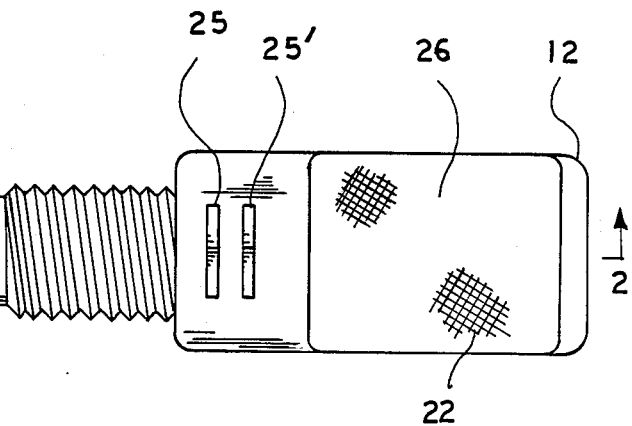
FIG. 3 is a top view of the device of FIG. 2, with the handlebar end section omitted for purposes of clarity and showing a typical speaker grille element.

Referring now to the drawings in which like numerals refer to like elements throughout, there is shown in FIGS. 1 and 2, an assembly 10 including a pair tubular extensions or handlegrips 12, 12'; that are sized to fit upon the end sections 11,11' of a handlebar member 11a. One or both of the two end sections form a compartment 16 suitable for retaining desired components of a radio such as batteries (not shown) and/or an electrical connector 13, the latter being mounted on the innermost end 13' of each shank 12a. In this manner, radio components in the two ends of the assembly may be electrically interconnected as in FIG. 1, or with an external radio receiver R as in FIG. 4. In either instance, wiring 17 will be seen to extend through the handlebar assembly and into a compartment 22 in the handgrips 12,12', for attachment to a pair of speakers 18—18 therein. communicates through wiring to a second, companion extension Each of two bulbous to extensions 12,12' is integral with a respective tubular externally threaded shank 12a insertable within end sections 11,11' by securing means such as an internal thread on each respective end of each tubular extension 12,12'.

As illustrated in FIG. 2 each shank 12a is integral with its respective bulbous distal extension 12,12' whereby, the device is adapted to be threaded into a standard set of handlebars and made secure thereby.

In addition to the compartments 16,22, a further compartment 23 is defined within the extensions 12,12' by the partition 27 as shown in FIG. 2. The purpose of this further compartment will be described hereinafter.

Each bulbous extension 12,12' will be seen to include an upwardly facing speaker grille 26 proximate to the upper surface thereof and consisting of a fine mesh grille 26. The speaker means, such as one or two speakers 18 are contained within the bulbous extension compartments 22, substantially as shown, with the faces of the speakers deployed opposingly one to another so as to emit sound through grille 26. Grille 26 is water repellent. Rain falling on the upwardly disposed grille 26 is prevented thereby from entering the interior of the device.

The partition 27 separates speaker cavity 22 from the adjacent cavity 23 and channels auditory energy from the speakers out of grille 26, enhancing the sound thereby and providing a firm structural support for any radio components housed within cavity 23.

Means for switching the portable radio apparatus on and off are incorporated within proximate to grille 26, and include central means such as a plurality of knobs for switching the radio apparatus on and off and for the tuning of the apparatus. Control knobs 25,25' transversely oriented as they protrude through the upper surface of the extensions 12,12' such that a user, by moving a thumb, may regulate and control the switching, volume and tuning of the radio device without the necessity of taking the hand away from the handlebars.

The wiring 17 extends interiorly through the handlebars and provides for the necessary communication with the speakers 18 so that a stereo effect is achieved in a cooperative action between one handgrip and the other.

Figure 4:
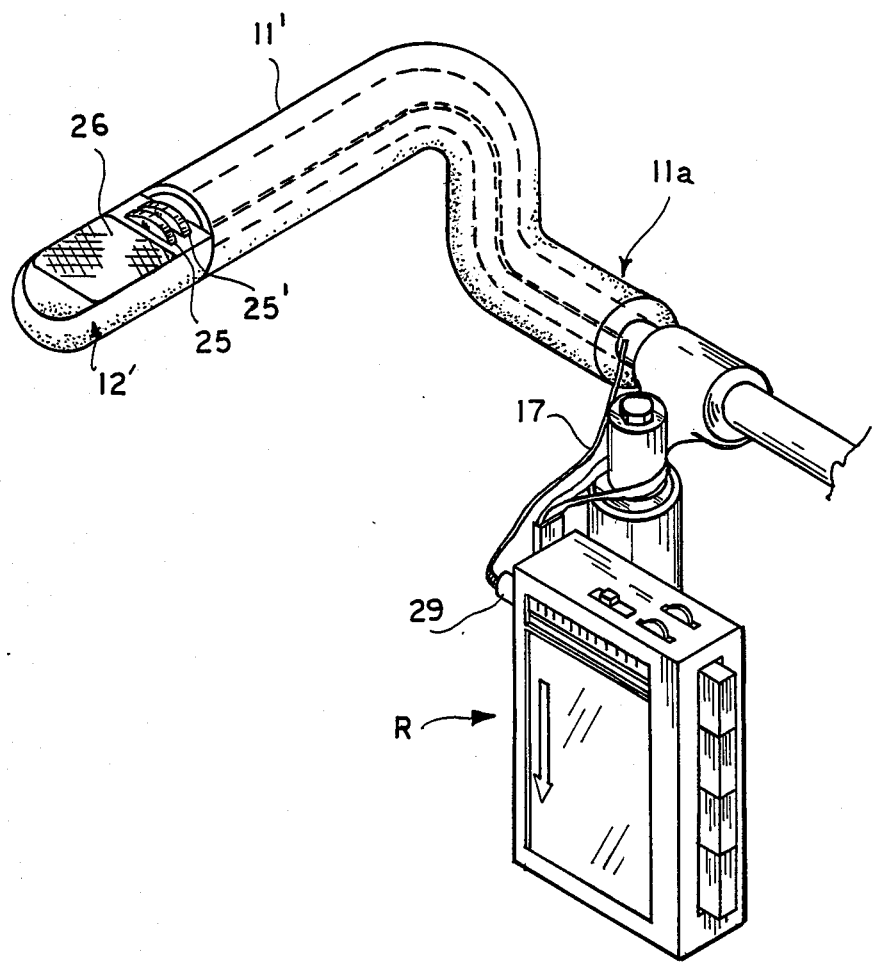
FIG. 4 is a perspective view of an alternate embodiment of the invention.

FIG. 4 illustrates an alternative embodiment of the device with a radio apparatus that may be any typical portable radio R affixed to the frame of a bicycle and the like. The handgrips 12,12', each with their complement of speakers 18, have a communicating means such as the connectors 13 which connects the radio apparatus with the pair of speakers in each respective handgrips, as by the jack 29.

The foregoing is considered illustrative only of the principles of the invention. Further, as numerous modifications and changes will readily occur to those skilled in the art, it is not desired to limit the invention to the exact construction and operation shown and described, and accordingly all suitable modifications and equivalents which may be resorted to, fall within the scope of the invention.

What is claimed is:

1. A portable radio apparatus incorporated with a hollow handlebar assembly having a pair of tubular end sections, comprising;
    a pair of tubular extensions each having a shank for securing to said handlebar end sections respectively,
    each said shank being integral with a bulbous distal portion of said extensions,
    mating threaded fastening means on each said shank and within said end sections engageable to secure said bulbous distal portions to said end sections,
    each said extension defining an interior compartment,
    means within at least one said extension compartment for processing of radio signals,
    on-off switching and tuning means on at least one said distal portion accessible externally of said bulbous distal portion,
    said means for processing of radio signals including speaker means within said compartment of each said extension,
    a grille element overlying said compartments containing said speaker means, and
    wiring within said hollow handlebar assembly communicating with said speaker means in said distal portion compartments, whereby a user grasping the handlebar assembly has immediate access to said switching and tuning means to regulate the output from said speaker means.

2. A portable radio apparatus according to claim 1 wherein, said tubular extension shanks having an innermost end provided with an electrical connector whereby, said wiring is conveniently attached and disconnected to said extensions during insertion and removal of said extensions from said end sections of said handlebar assembly.

3. A portable radio apparatus according to claim 1 wherein,
    said interior compartment is within said bulbous distal portion, and
    an additional interior compartment within each said shank.

4. A portable radio apparatus according to claim 1 including,
    a partition within said bulbous distal portion defining a further compartment within each said extension, and
    said switching and tuning means including a pair of control knobs substantially fully disposed within said further compartments.

5. A portable radio apparatus according to claim 1 wherein, said handlebar assembly is a bicycle handlebar.

6. A portable radio apparatus according to claim 1 including,
    a radio receiver disposed exteriorly of said end sections and bulbous distal portions, and
    said wiring within said hollow handlebar assembly communicating between said speaker means and said exteriorly disposed radio receiver.

7. A portable radio apparatus according to claim 1 wherein, each said speaker means includes a pair of speakers.

* * * * *